US006993355B1

(12) United States Patent
Pershan

(10) Patent No.: US 6,993,355 B1
(45) Date of Patent: Jan. 31, 2006

(54) METHODS AND APPARATUS FOR CONNECTING FAMILY MEMBERS

(75) Inventor: Barry Paul Pershan, Olney, MD (US)

(73) Assignee: Verizon Services Corp., Silver Spring, MD (US)

( * ) Notice: Subject to any disclaimer, the term of this patent is extended or adjusted under 35 U.S.C. 154(b) by 377 days.

(21) Appl. No.: 10/081,310

(22) Filed: Feb. 22, 2002

(51) Int. Cl.
*H04B 7/00* (2006.01)
*H04Q 7/20* (2006.01)

(52) U.S. Cl. .................. 455/518; 455/412.2; 455/413; 455/415; 455/416; 455/417; 455/519; 370/352

(58) Field of Classification Search .............. 455/518, 455/415, 416, 417, 412.2, 413, 414.1, 412.1, 455/519; 370/352
See application file for complete search history.

(56) References Cited

U.S. PATENT DOCUMENTS 5,930,723 A * 7/1999 Heiskari et al. ............ 455/518
6,385,453 B1 * 5/2002 Foladare et al. ............ 455/445
6,535,730 B1 * 3/2003 Chow et al. ................ 455/416
2003/0125072 A1 * 7/2003 Dent .......................... 455/551

* cited by examiner

*Primary Examiner*—Nay Maung
*Assistant Examiner*—Shaima Q. Aminzay
(74) *Attorney, Agent, or Firm*—Leonard C. Suchyta, Esq.; Joel Wall, Esq.; Straub & Pokotylo

(57) ABSTRACT

Communications methods for allowing groups of individuals, such as family members, to contact one another when no one is available to answer calls to a primary, e.g., family, telephone number are described. Calls which go unanswered are connected to a telephony device capable of storing messages and initiating conference calls. If the calling party is determined to be a family member the telephony device accesses a table of contact information corresponding to the unanswered telephone number and offers the caller the opportunity to hear messages from other family members and/or initiate a conference call to one or more family members who have supplied a contact telephone number. Family members can access and update the table of messages and contact number information by telephone or the Internet. Table information can be accessed and updated remotely thereby providing a method of communicating with family members even when no one is at home.

20 Claims, 9 Drawing Sheets

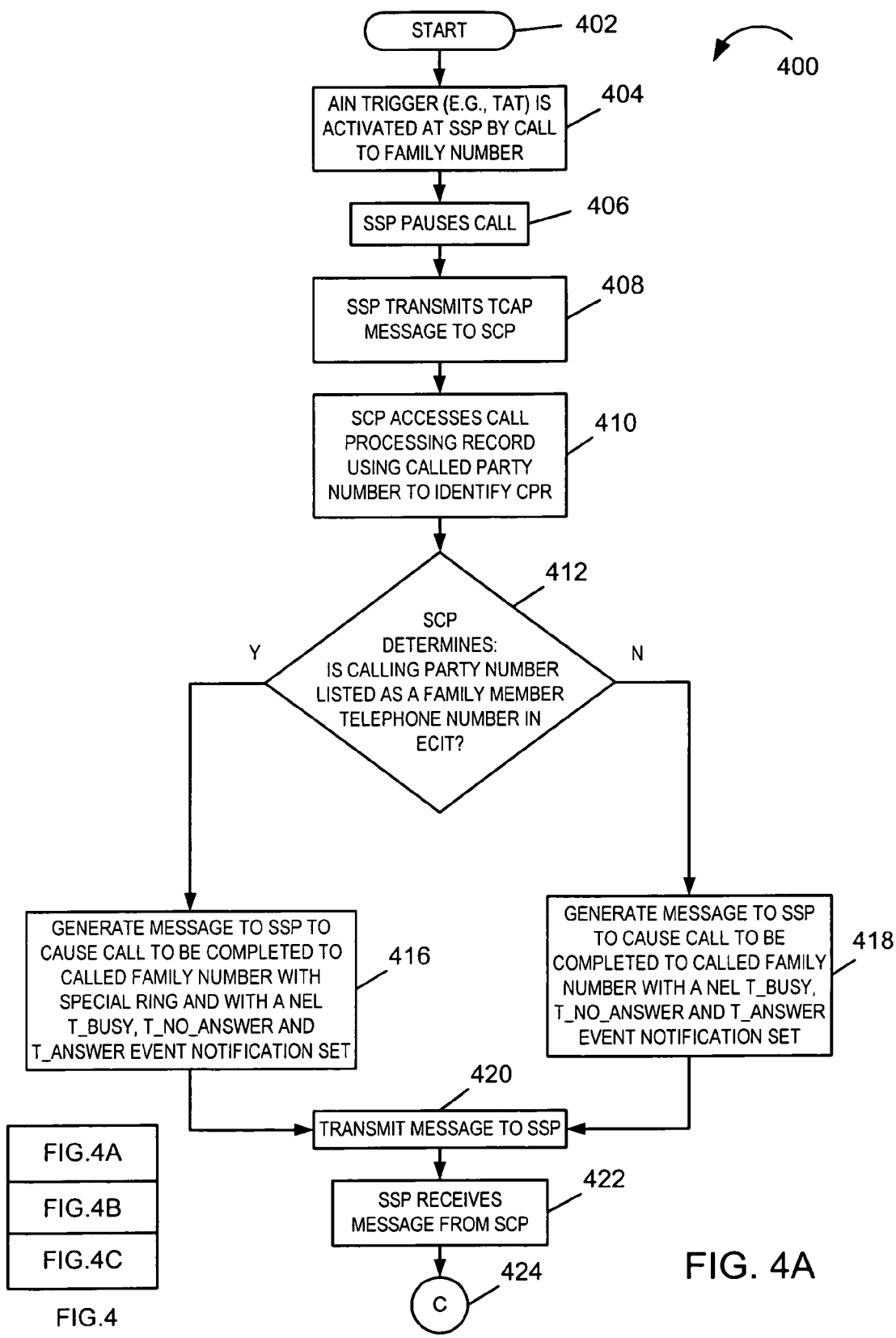

FIG. 5

SMITH FAMILY - EMERGENCY CONTACT INFORMATION TABLE — 502

FAMILY TELEPHONE NUMBER: (732) 555-1234 — 508

MASTER PIN XXXX — 503

| FAMILY MEMBER 504 | CALLING PHONE NUMBERS 506 | CONTACT PHONE NUMBERS 508 | CONTACT MESSAGE 510 | E-MAIL ADDRESS 512 | E-MAIL NOTIFICATION 514 | PIN 515 |
|---|---|---|---|---|---|---|
| JOHN SMITH | LL: (732) 555-1235<br>M: | 1: (732) 555-2351<br>2: (732) 555-1236<br>3: (917) 555-1237 | TEXT MESSAGE — 570 | JOHN@WWW.COM | YES | XXXX |
| JOAN SMITH | LL: (732) 555-1235<br>M: (732) 555-9874 | 1: (732) 555-6851<br>2: (732) 555-9874 | VOICE MESSAGE — 572 | JOAN@WWW.COM | NO | XXXX |
| ADAM SMITH | LL: (732) 555-5612<br>M: (732) 555-3214 | 1: (732) 555-4387 | TEXT MESSAGE — 574 | ADAM@WWW.COM | YES | XXXX |
| JACOB BARNS | LL: (732) 555-5931<br>M: | | | | NO | XXXX |

530 → JOHN SMITH
540 → JOAN SMITH
550 → ADAM SMITH
560 → JACOB BARNS

72'

METHODS AND APPARATUS FOR CONNECTING FAMILY MEMBERS

FIELD OF THE INVENTION

The present invention is directed to communications systems and, more particularly, to routines and apparatus for allowing groups of individuals, e.g., family members, to communicate with one another, e.g., in times of emergency.

BACKGROUND OF THE INVENTION

During times of national tragedy, or during a family emergency, knowing about the safety and location of family members and close friends can be very important. Talking to family members, or even just hearing their voices, can provide comfort in those anxious times. Since emergency situations may occur at any time, it is likely that family members may be scattered in different locations making it hard for them to communicate with each other. For example, at the time of an emergency, parents may be away from home, e.g., at work, while the children are off visiting friends. No one may be at home at the family residence, e.g., house, to answer calls and relay information.

Various call forwarding services are available that can forward calls from one location, e.g., a family residence, to another location where a person is temporally located. Such forwarding services may include a call screening feature which limits call forwarding, e.g., to calls from telephone numbers on a subscriber provided list or who have provided a particular personal identification number (PIN). Such call forwarding services normally are enabled/disabled by the subscriber.

Such known call forwarding services fail to provide a way for connecting multiple, e.g., 3 or more, family members at different locations together in a single call. Such conference calls are particularly desirable in times of emergency where several, e.g., 3 or more, family members may want to share information.

Wireless telephones offer one method for contacting individual family members when they are away from home. Unfortunately, during times of emergency, e.g., national disaster, mobile phones suffer from several limitations. For example, during a disaster there tends to be a flood of wireless calls to/from the region where the disaster occurred. This creates service availability issues, e.g., wireless calls may not go through due to congestion of the wireless telephone networks. Physical destruction of wireless telephone transmitters in a disaster region may also present problems when attempting to contact family members via wireless phone in a disaster area. Accordingly, it may not be possible to contact individual family members via wireless phone during a disaster.

Even when a family member can be contacted by wireless phone, it is often not easy to conference in other family members as part of a multi-call telephone conference. Accordingly, even when an individual family member can be reached by wireless phone, it can often be difficult to quickly disseminate the information about the individual's status to all family members.

E-mail offers an alternative means of communicating during an emergency. While E-mail is becoming more common, it is still rare for every member of a family to have ready access to E-mail, particularly when away from home. Many E-mail users still rely on dial-up connections to access their E-mail. Such E-mail users may be reluctant to tie up their telephone lines during emergencies in fear of missing a call from a loved one. However, for users of mobile E-mail devices, e.g., personal data assistants (PDAs) and notebook computers with wireless E-mail capability, E-mail presents a useful way of exchanging at least some limited information during an emergency.

In the uncertain world of modern times, there is a need for a way of establishing communications between multiple family members during times of an emergency or disaster. Accordingly, there is a need for methods whereby family members who are away from home can easily exchange information with one another. It is desirable that any such method not be dependent on the need for an individual to have or use a mobile phone. It is also desirable that any such methods not be dependent on the ability of family members to transmit and/or receive E-mails. While it is desirable that an emergency communications service not be dependent on mobile telephone and/or E-mail use, when available it would be beneficial if such communications methods could be used to exchange at least a limited amount of information.

From a practical standpoint, it is desirable that a method of allowing family members to communicate with one another in an emergency be capable of being implemented whether or not one or more family members are at home at the time of the emergency situation. It is also desirable that the communication method allow and/or provide for telephone conference calls between multiple family members so that a large number of family members can obtain information about the other members at the same time.

Accordingly, there is a need for new methods and apparatus that can be used to allow members of a family or other group of people to communicate with one another during times of national, family or other types of emergencies.

SUMMARY OF THE INVENTION

The present invention is directed to methods and apparatus which allow groups of individuals, e.g., family members, to communicate with one another even when no one is available to answer a primary telephone number, e.g., a family telephone number, associated with the group.

In accordance with the present invention, a set of information, e.g., a table, is created for each group of individuals using the service. The table for a group, e.g., family, is associated with a primary telephone number, e.g., family telephone number, which is also associated with the group. The table includes a list of members corresponding to the group associated with the primary telephone number. Phone numbers from which the individual group members are likely to call are also stored for identification purposes in the table. A PIN may be associated and stored with each group member for purposes of specifically identifying the group member when calling from a telephone associated with a number which is not listed. Messages in the form of text or recorded voice messages may be included with emergency contact telephone number information in the table.

Family members can access and update the messages and emergency contact information from remote locations using a telephone and/or the Internet. Members listed in the table may leave general messages intended for all other group members. In addition, or alternatively, they can leave messages for other specific members of the group.

The present invention can be used to allow group, e.g., family, members to communicate with one another. This service is particularly useful in times of emergency such as local or national disasters, or at other times when no one is available to answer calls to the primary, e.g., family telephone number. In accordance with the invention, when calls made to the primary telephone number, e.g., family residence telephone number go unanswered, the unanswered call is connected to an intelligent peripheral device capable of accessing the family's emergency information table and initiating a conference call to family members.

Calling party information, e.g., the calling party's telephone number and/or a PIN is checked to determine if the calling party is a family member. If the calling party is determined to be a family member, the calling party is presented with messages and a list of family members who have provided emergency contact telephone numbers. The family member is then provided with an opportunity to initiate a conference call to family members listed in the information table. The caller may select to initiate a conference call to all or some of the listed family members. In response to the family member's selection, the peripheral device initiates calls to the selected individuals using the contact information, e.g., telephone numbers, provided in the information table for emergency contact purposes.

Since the peripheral device initiates the calls to the selected family members using the contact telephone number information from the emergency contact information table, there is no need for the calling party to dial or otherwise manually initiate individual calls to each of the selected family members.

When a called party answers a call initiated by the peripheral device as part of a conferencing operation, the peripheral device bridges the answered call with the original call. In this manner, a conference call can be established between two, three or more family members quickly and easily.

The conference call can be billed to the family telephone number, e.g., as a function of the number of call participants, e.g., as indicated by the number of calls placed by the peripheral device, and the duration of the conference.

The communications method of the present invention can be implemented in conjunction with existing telephone services. For example, it can be used as a supplement to a conventional call forwarding service, e.g., by responding to calls to the family home which go unanswered despite call forwarding.

While described in the context of an AIN system which uses an IP as a conference bridge, the service may be implemented using a variety of telephony devices with call initiation and conferencing capability.

Various additional features and advantages of the present invention will be apparent from the detailed description which follows.

BRIEF DESCRIPTION OF THE DRAWINGS

FIG. 5 illustrates an exemplary emergency contact information table, which may be used by any of the methods illustrated in FIGS. 2–4.

DETAILED DESCRIPTION

Figure 1:
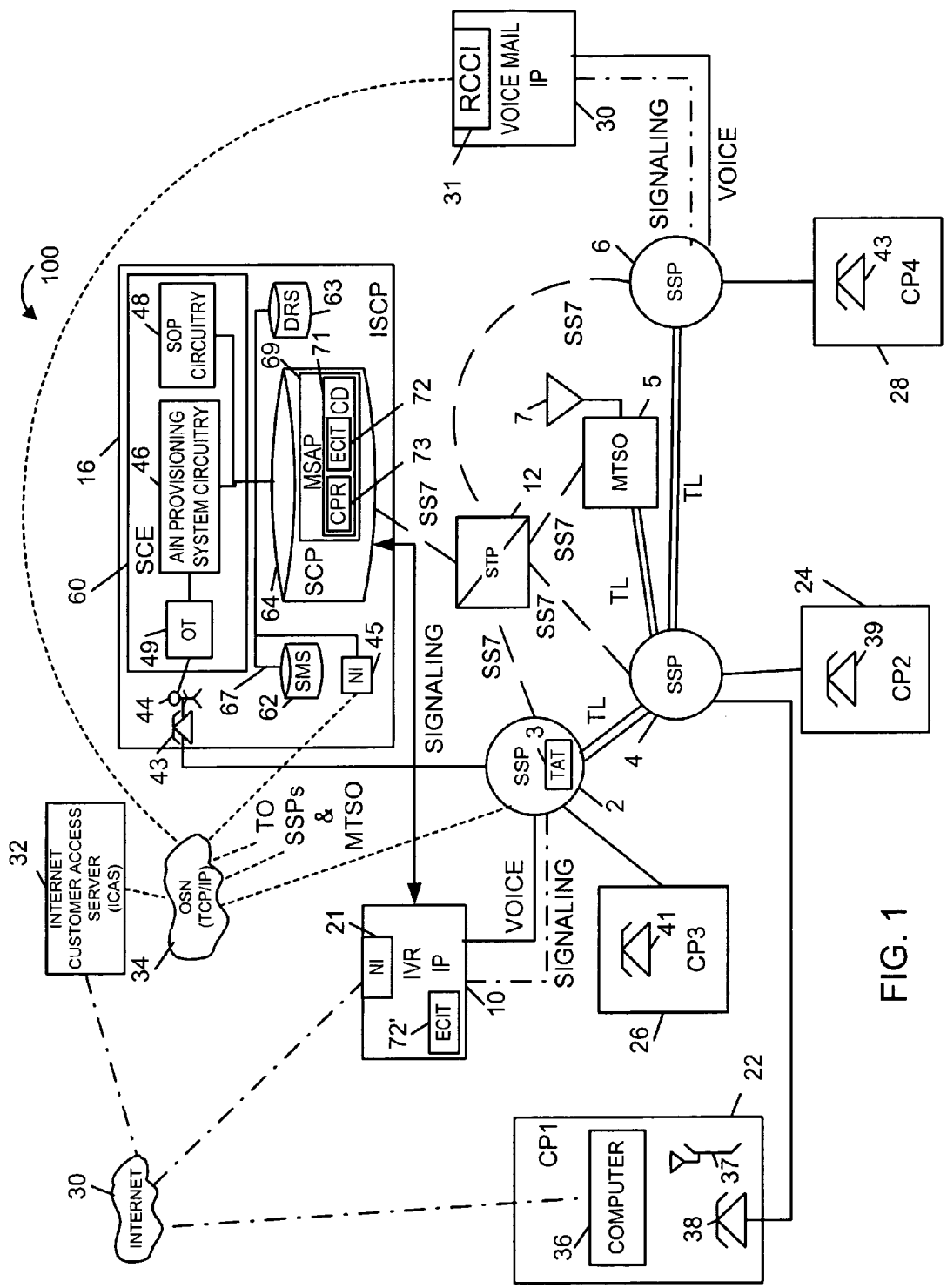
FIG. 1 illustrates a communication system implemented in accordance with an exemplary embodiment of the present invention.

FIG. 1 illustrates a communication system 100 implemented in accordance with an exemplary embodiment of the present invention. The system 100 includes routines, call processing logic and hardware for providing the communications service of the present invention. The system 100 supports communications via the Internet 30, as well as the public switched telephone network (PSTN). The PSTN includes a plurality of signal switching points (SSPs) 2, 4, 6 which, as is known in the art, may be implemented using known Class 4 and/or Class 5 telecommunications switches, e.g., telephone switches, capable of supporting the signaling system seven (SS7) protocol. Each SSP 2, 4, 6 may correspond to a different telephone central office. Trunk lines (TLs), which may comprise, e.g., one or more T1 lines, interconnect the various SSPs 2, 4, 6. In addition to SSPs 2, 4, 6, the system 100 includes a mobile telephone switching office (MTSO) 5 for servicing mobile telephone calls. The calls may be received via antenna 7. The MTSO 5 is coupled to one or more SSPs, e.g., SSP 4 via trunk lines. In this manner, cellular telephone calls can be routed and processed via an SSP 4 allowing interaction with land line telephones as is known in the art.

Each SSP 2, 4, 6 is normally connected to one or more customer premises (CP) which may include, e.g., residences and/or offices. In the FIG. 1 example, first and second customer premises 22 and 24 are coupled to the second SSP 4, third customer premises 26 is coupled to the first SSP 2 while the fourth customer premises 28 is coupled to SSP 6. Connections between the SSPs and CPs may be by POTS lines, ISDN lines, DSL, or other known communications lines.

Communications equipment, referred to as customer premise equipment (CPE) is located at each customer premises 22, 24, 26, 28. Customer premise equipment may include, e.g., telephones, faxes, computers, etc. In FIG. 1, a computer 36, land-line telephone 38, and mobile telephone 37 are shown as being located at the first customer premises 22. Since cell phone 37 is a mobile communications device it need not be physically located at the first customer premises to operate. The computer 36, located at the first customer premises 22 is coupled by any one of a plurality of known connection techniques, e.g., telephone dial-up, ISDN, DSL, etc., to the Internet 30, also known as the World Wide Web.

While the second, third and fourth customer premises 26, 28 are illustrated as including only landline phones, it is to be understood that they may have any number of communications devices including, e.g., telephones, faxes, and computer devices. Additional telephone service subscribers may be coupled to any one of the SSPs 2, 4, 6.

The system 100 is implemented using advanced intelligent network (AIN) techniques. Accordingly, the processing of calls directed to a customer's telephone line and received by an SSP from a telephone customer's line may be controlled by instructions included in customer call processing records (CPRs). In the system 100, the CPRs are stored at an Integrated Services Control Point (ISCP) 16. The CPRs may include sequential contingent call processing instructions in the form of a next event list (NEL). At least one CPR exists for each subscriber to an AIN based service. A customer's CPR is accessed in response to activation of an AIN trigger set at, e.g., the SSP 2, 4, or 6 to which the subscriber's line or lines are connected, e.g., by POTS lines.

The ISCP 16 includes a network interface (NI) 45, a service management system (SMS) 62, data and reporting system (DRS) 63, service creation environment (SCE) 60 and an SCP 64. A local network 67 couples the various components of the ISCP 16 together.

The network interface 45 couples the ISCP 16 to various other components of the telephone network 100 via a TCP/IP based network referred to as an operational services network (OSN) 34. The OSN 34 interconnects SSPs 2, 3, 6, the MTSO 5, Intelligent Peripherals (IPs) 18, 10, 20, and the ISCP 16. Thus, the OSN 34 is a network over which control and signaling information can be passed between the various system components, e.g., using TCP/IP. In addition to being connected to the OSN 34, ISCP 16 is connected, via its SCP 64, to the SSPs and MTSO via one or more signal transfer points (STPs) 12 and Signaling System Seven (SS7) interconnects over which messages, data, and requests for call processing control instructions can be communicated between the SSPs 2, 4, 6, or MTSO 5 and ISCP 16 in accordance with the SS7 protocol.

The SCP 64 includes a multi-service application platform (MSAP) database 69, which includes customer data (CD) 71 for each of a plurality of other service subscribers. The customer data 71 includes, for each customer: 1) a list of the services to which the customer subscribes; 2) a password which may be input via DTMF signals; 3) a call processing record (CPR) 73 which is used to instruct an SSP how to process a call in response to one or more AIN triggers to thereby implement the services to which the customer subscribes; and 4) an emergencies contact information table (ECIT) 72. FIG. 5 illustrates an exemplary ECIT table. The subscriber's ECIT 72 may be a duplicate of an ECIT 72' stored in the IP 10. In some embodiments the SCP 64 obtains information from the ECIT 72' in the IP 10. The ISCP 16 supports the emergency communications service of the present invention in addition to other services, e.g., call forwarding, call screening and voice mail.

The customer data 71 which includes one or more call processing records 73 is generated, at least initially, by the SCE 60 in response to input received from a service representative or operator 44. Customer data in the database 71 and the CPR 73 may, after initial provisioning of a service for a customer, be updated by the customer via telephone or via the Internet through the use of a Web browser.

The SCE 60 includes an operator terminal (OT) 49, service order processing circuitry 48 and AIN provisioning system circuitry 46. The operator terminal 49 is used by the service representative 44 to enter service information, e.g., to create a service account for a new subscriber. The entered data may be information, e.g., relating to the addition of a new customer, the adding of a service for an existing customer, and/or the cancellation of a service being provided to an existing customer. The service order processing circuitry 48 is used to generate service orders, e.g., orders to add or cancel a service, in response to service information entered into the operator terminal 49. The AIN provisioning system circuitry 46 is responsible for setting and/or updating AIN triggers at the various signal switching points (SSPs and MTSO) required to implement a service order generated by the service order processing circuitry 48. In addition to setting AIN triggers, the AIN provisioning system circuitry 46 is responsible for generating and/or updating customer data, e.g., call processing records 73, ECIT 72, 72' and other information stored in various locations in the system 100, as required to implement a service order. As will be discussed below, various IPs 10, 30 are used to provide services to telephone service subscribers. Thus, in addition to updating information in the customer database 71, the AIN provisioning system circuitry is responsible for updating information in the various IPs 10, 30 as required. The updating of the IPs and the setting of AIN triggers can be performed by the AIN provisioning system circuitry 46 through communications with the various system components conducted using the OSN 34 and/or via SS7 links.

Once service to a customer has been initially configured by a service representative 44, a service subscriber, e.g., an emergency communications service subscriber can, in accordance with the present invention, update various service information though the use of a personal computer and a Web Browser application. Known browsers which can be used for this purpose include Internet Explorer, AOL, Netscape, etc.

In the FIG. 1 system, the service subscriber to whom the first customer premises corresponds can update the subscriber's service information, e.g., emergency contact service information stored in tables 72, 72', via the use of computer 36 and an Internet connection.

The system 100 includes an Internet Customer Access Server (ICAS) 32. The server 32 serves as a secure gateway via which emergency communications service subscribers can update and configure their telephone service information using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. ISCP 16, and/or IP 30, coupled to the OSN 34.

In order to implement various services, such as the emergency communications service of the invention and voice mail, intelligent peripheral (IP) devices such as IPs 30 and 10 are used. The first IP 10 is an interactive voice response (IVR) IP which is capable of, and includes circuitry for, performing speech recognition and/or DTMF signal detection operations as well as playing voice prompts and other messages to a telephone service subscriber.

IVR IP 10 is coupled to the first SSP 2 via audio (voice) lines. It is also coupled to the OSN 34 and the Internet 30 through a network interface (NI) 21. The IVR IP 10 may be implemented using known hardware and includes circuitry and/or software for implementing steps of the present invention. This includes circuitry for generating and sending E-mail messages.

The IVR IP 10 serves as a platform by which a telephone service subscriber and/or an individual listed in an ECIT 72, 72' can update his/her information, e.g., contact telephone number and/or E-mail address, through a telephone as opposed to an Internet connection. A telephone service subscriber can establish a service updating or management session with the IVR IP 10, by dialing a telephone number associated with the IVR IP 10. Dialing of the IVR IP's telephone number results in the subscriber's call being routed to SSP 2 and a voice/DTMF connection to the IP 10 being established.

IP 10 includes various security features, e.g., customer identification and password entry requirements, as does the ICAS 32, to insure that telephone customers and individuals listed in ECIT 72, 72' are limited to accessing and updating their own information and not those of other telephone service subscribers. As an additional security measure, upon initial activation, customers may be required to call from their subscribed to telephone. In such an embodiment, the IP 10 will read the ANI (Automatic Number Identification) of the calling number and will verify with the ISCP 64 that the caller is an authorized new user. The IP 10 then requires the customer to enter a new PIN (Personal Identification Number) to be used for future sessions.

The second IP 30 is a voice mail IP which provides voice mail service to voice mail telephone service subscribers. In accordance with one feature of the present invention, voice mail service is provided to emergency communications service subscribers. However, voice mail service is not an absolute requirement for implementing the communication service of the present invention. A subscriber can access his/her mailbox by calling a telephone number associated with the voice mail IP. When connected to the voice mail IP, a voice mail service subscriber can enable/disable voice mail.

Figure 2A:
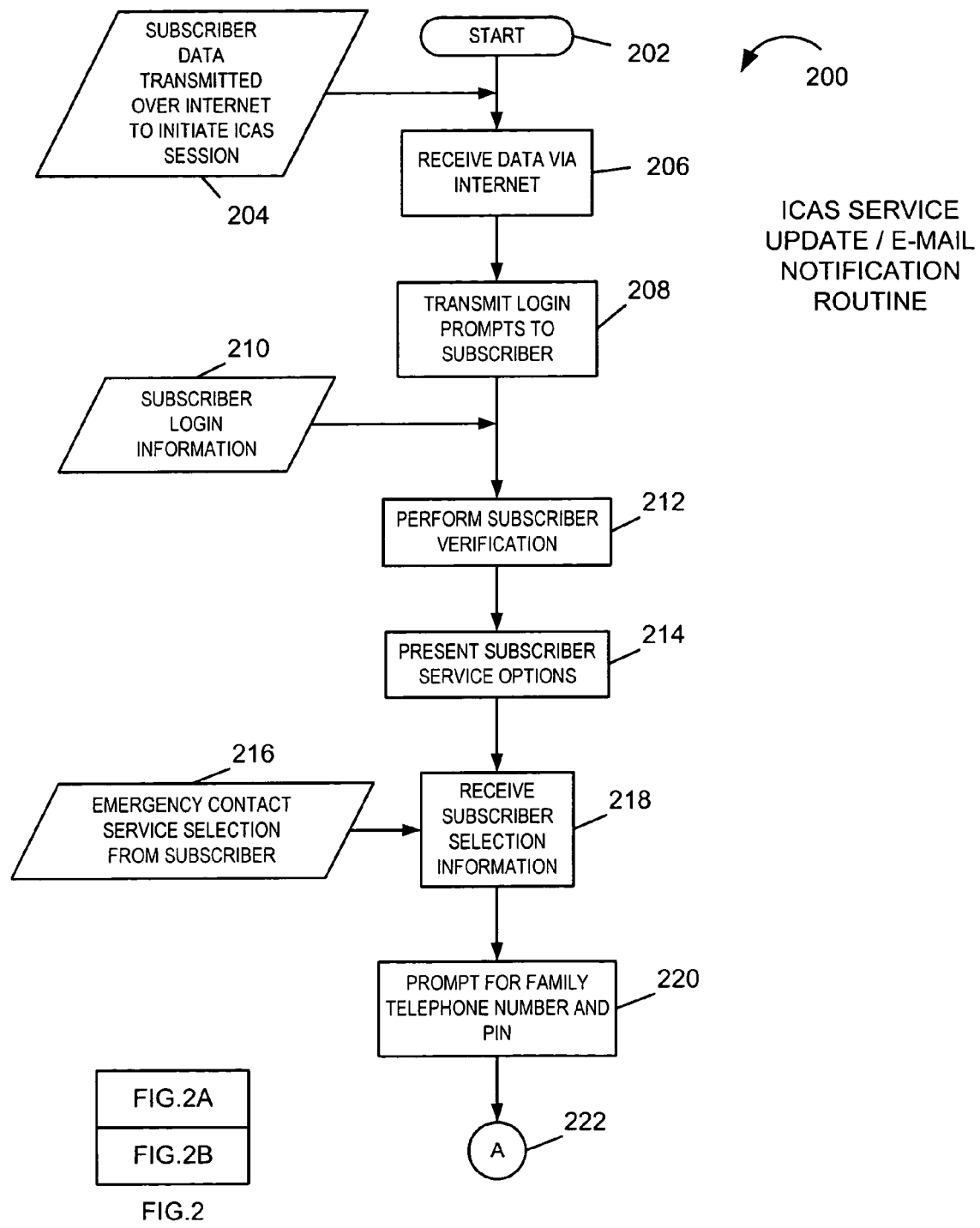
FIG. 2 and FIG. 3 are flow diagrams illustrating the steps of exemplary communication information updating methods of the present invention.
Figure 2B:
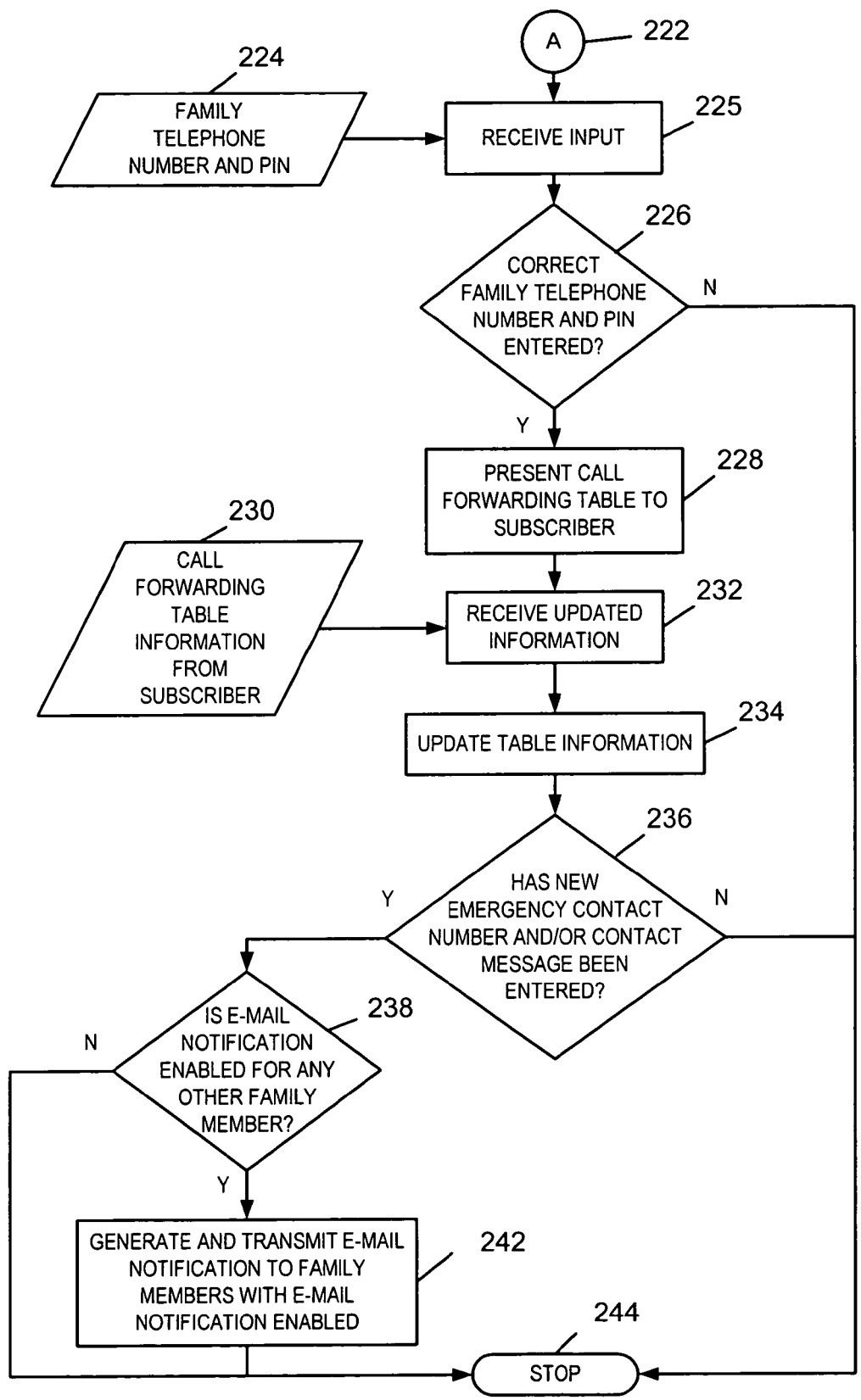

FIGS. 2 and 3 illustrate methods for updating and/or checking emergency contact information. As mentioned earlier, family members can update and/or check emergency contact information tables over the Internet or using a telephone. As part of the update process, they can add/delete family members to/from the table. FIG. 2, which comprises the combination of FIG. 2A and FIG. 2B, illustrates the steps of an exemplary method 200 performed by the ICAS 32 for updating and/or checking the content of emergency contact information table (ECIT) 72' via the Internet.

Exemplary method 200 starts in step 202 with the ICAS 32 monitoring for input from the Internet 30. Data used to initiate an ICAS session 204 is transmitted from a subscriber's computer over the Internet 30 to the ICAS 32. In step 206 the data transmitted via the Internet 30 is received by the ICAS 32. Next, in step 208, ICAS 32 transmits a login prompt and/or screen to the subscriber. In step 212, the subscriber is verified once subscriber login information 210 is received.

In step 214, the subscriber is presented with a number of service options including, e.g., updating emergency contact information. In step 218, information 216 indicating selection of the emergency contact information update option is received by the ICAS 32 from the subscriber.

When the emergency contact service is initially set up, the family designates a family telephone number and a master PIN. The master PIN is used to determine who has authority to add/delete family members to/from, emergency contact information table 72, 72'. Separate PINs may be assigned to different members of the family to help distinguish family members and to determine the authority to update the information corresponding to a particular family member. These separate PINs can be limited to allow access for adding/changing contact phone numbers and contact messages for particular family members, but not others. In such an implementation, the master PIN may be kept secret for parental control purposes.

The PINS, as will be discussed below, also allow authorized family members to use the emergency contact service of the present invention when calling from locations/telephones other than the ones listed in the emergency contact information table 72'. In step 220, the subscriber is prompted for the family telephone number and/or the PIN. The subscriber may be listed in one or more emergency information tables 72'. The family telephone number is used to identify the specific table to be accessed since different tables have different family telephone numbers associated therewith. The PIN is used to determine the level of access the subscriber is to be given to edit the identified table's information. Operation proceeds from step 220 to step 225 via connecting node 222.

In step 225, the family telephone number and/or PIN 224 is received from the subscriber. In decision step 226, a determination is made as to whether or not the family telephone number and/or PIN received from the subscriber is correct. If the family telephone number and/or PIN is not correct the method 200, proceeds to step 244 and stops. Prior to stopping, in some embodiments, the subscriber is returned one or more times to step 220, and presented the chance to enter accurate information.

In step 226, if the family telephone number and/or PIN received from the subscriber is determined to be correct, the method 200 proceeds to step 228. In step 228, the subscriber is presented with the emergency contact information table corresponding to the supplied family telephone number. An exemplary emergency contact information table 72' is illustrated in FIG. 5.

Exemplary table 72' includes the family telephone number 502, e.g., (732)555-1234. The table 500 also includes a first column 504 that lists members of a family, e.g., the Smith family, a second column 506 that lists telephone numbers from which the family members are likely to call, a third column 508 that lists contact telephone numbers, a forth column 510 that indicates if there is a stored voice or text message (570, 572, 574), a fifth column 512 that lists the E-mail address of the family member, if any, and a sixth column 514 that indicates if the family member listed in the corresponding row would like E-mail notifications when updates are made to the table 72'. A seventh column 515 is used to store the PIN associated with the listed service subscriber, while block 503 is used to store the master PIN for the Smith family 72'. The PINs may be stored and displayed in encrypted form for security purposes.

In table 72' each row of information 530, 540, 550, 560 corresponds to a different family member. Row 530 includes exemplary information for John Smith. Col. 560 indicates that land line number (732)555-1235 is a telephone number from which John Smith may call. Mobile telephone number information is not provided for John. In accordance with the present invention John Smith can enter one or more telephone numbers, e.g., up to three, which can be used to contact him, e.g., in an emergency. The contact numbers will be tried, when establishing a conference call, in the order listed. The exemplary table includes a text message 570 which was left by John. John's email address, listed in col. 512, is john@www.com, and he indicated that he would like E-mail notifications when there is an update to the table.

Row 540 includes exemplary information for Joan Smith, e.g., the mother of the Smith family. Land line number (732)555-1235, and mobile number (732)555-9874 are telephone numbers associated with Joan from which she may call. Joan Smith entered two contact telephone numbers 1: (732) 555-6851 and 2: (732) 555-9874. She left a voice message 572, her email address is joan@www.com, and she indicated that she would not like E-mail notifications when there is an update to the table.

Row 550 includes exemplary information for Adam Smith, e.g., a child in the Smith family. Land line number (732)555-5612, and mobile number (732)555-3214 are telephone numbers associated with Adam from which he may call. Adam Smith entered one contact telephone number (732) 555-4387. He left a text message 574, his email address is adam@www.com, and he indicated that he would like E-mail notifications when there is an update to the table.

Finally, row 560 includes exemplary information for Jacob Barns, who is a close family friend of the Smith family and, for purposes of the service is treated as a family member. Land line telephone number (732)555-5931 is a telephone number from which he may call. Jacob has not entered a contact number, a message, or an email address. As a result he will not receive E-mail notifications when there is an update to the table or be contacted when an emergency occurs. Jacob Barns may update the information in the table 72' at any time thereby allowing him to be contacted during an emergency.

Returning to step 228 of FIG. 2, after entry of telephone number and PIN is verified, the table 72' corresponding to the entered family telephone number is retrieved and presented to the service subscriber. This may involve transmitting the table to the subscriber's computer and displaying it thereon. The subscriber's ability to modify the table's content is determined based on which PIN was entered. The subscriber can add and/or update the subscriber's calling phone numbers 506, contact phone numbers 508, a message 510, E-mail address 512 and E-mail notification 514 status. In addition, the subscriber can read text messages left by other family members 570, 574, or the subscriber can listen to voice message 572. If the master PIN was entered the subscriber may also add/delete members from the table 72'. In the context of the example being discussed the term subscriber refers to individual or party listed as a family member in the ECIT 72, 72'.

In step 232, updated table information 230 is received from the subscriber. In step 234, the information received from the subscriber is updated to the extent the changes are permitted based on the received PIN. The update process involves sending the updated information to the various locations where it is stored, e.g., in IP 10 and SCP 64. After the stored tables 72, 72' are updated, operation proceeds to step 236. In step 236 a determination is made as to whether or not a new emergency contact number and/or contact message has been entered. If no new emergency contact number or contact message was entered, operation proceeds to step 244 wherein the update routine stops, e.g., pending the receipt of new information.

If a new emergency contact number and/or contact message was entered, operation proceeds from step 236 to decision step 238. In step 238, the E-mail notification setting for family members other than the one making the changes is checked. If a family member other than the one making the changes has set the E-mail notification to "yes", operation proceeds to step 242, otherwise it proceeds directly to stop step 244.

In step 242, an E-mail including the updated contact information is generated and transmitted to those family members who indicated that they wanted E-mail notifications. Then the method 200 stops in step 244.

Figure 3A:
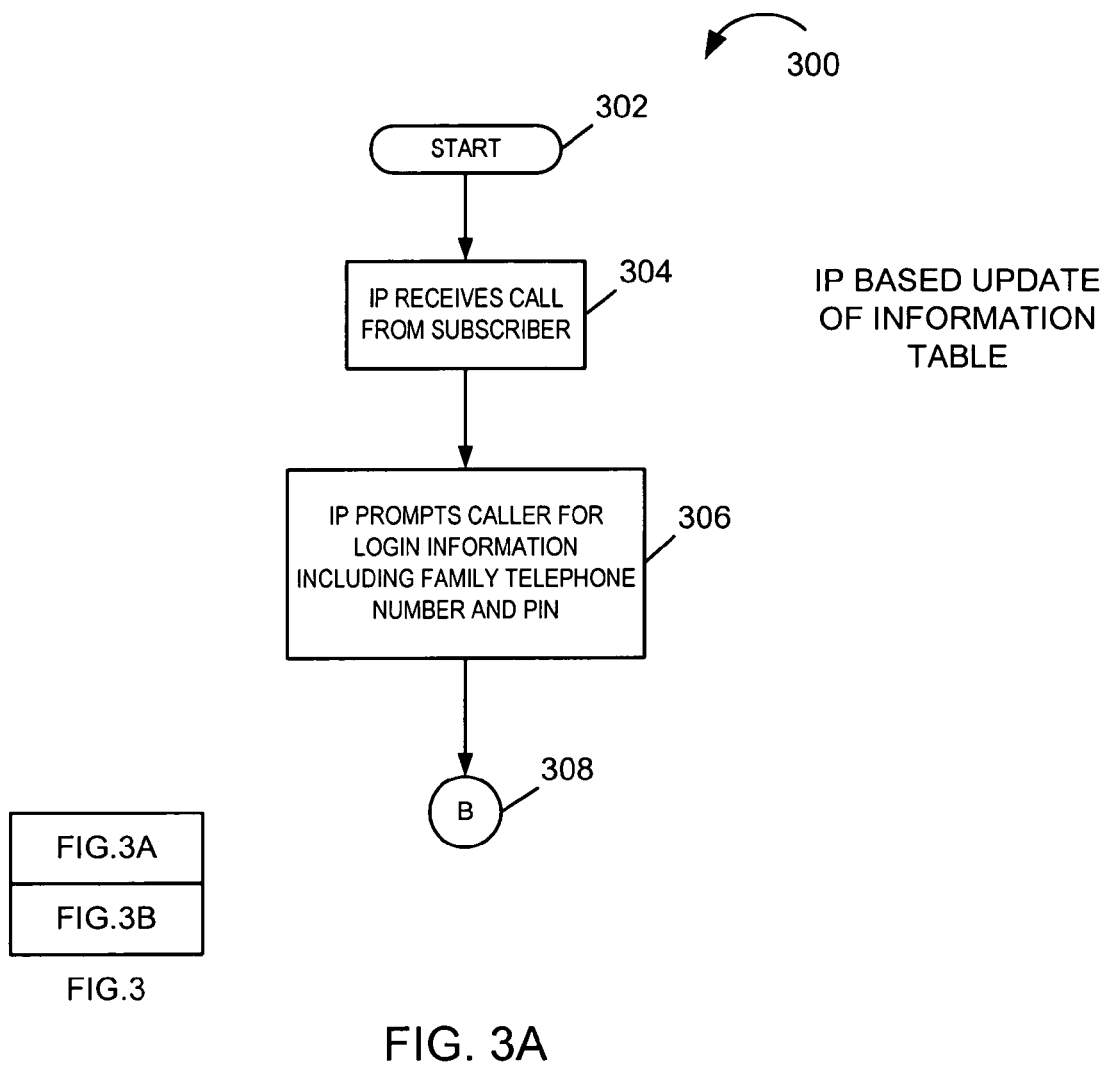
Figure 3B:
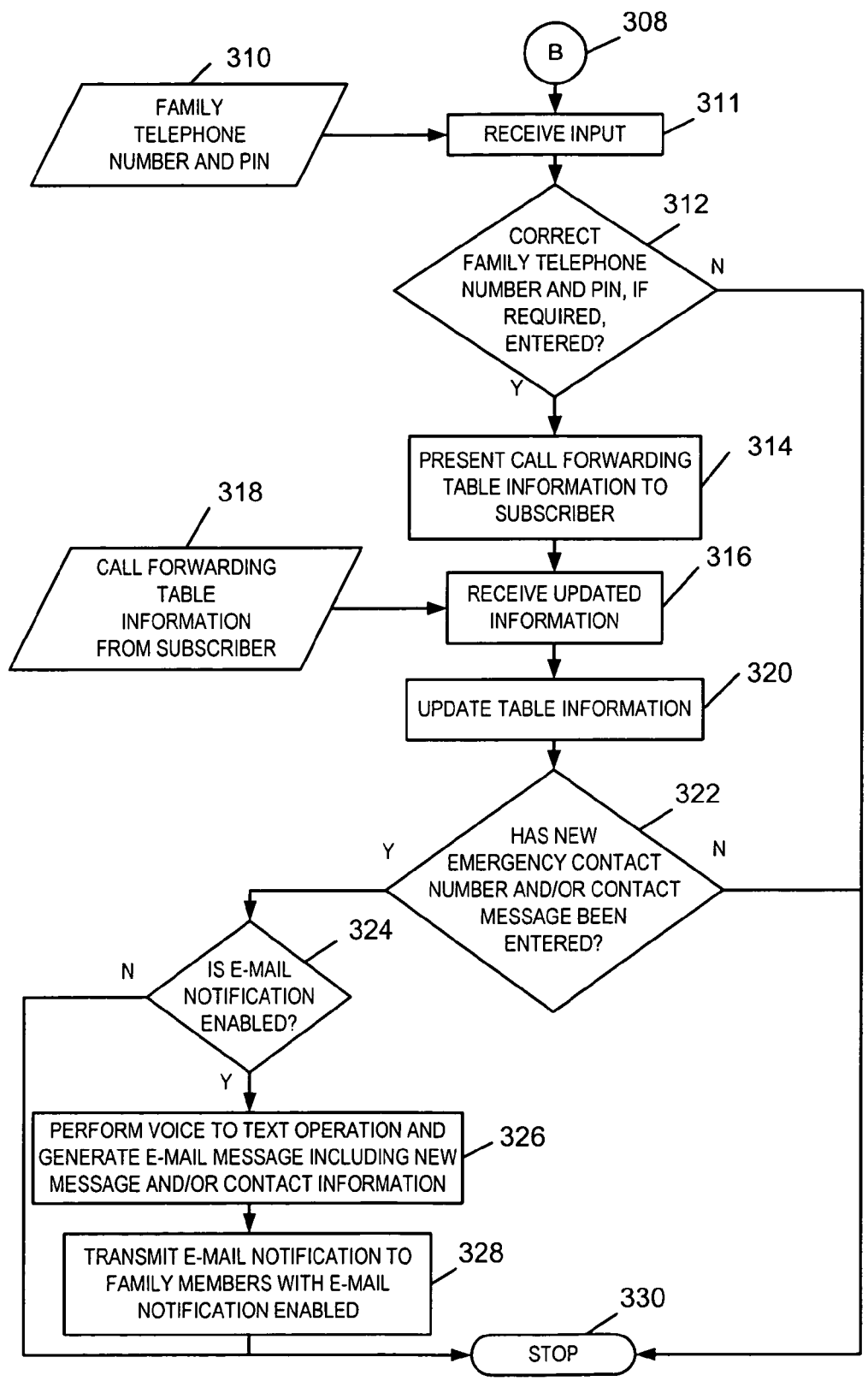

FIG. 3, which comprises the combination of FIGS. 3A–3B, illustrates the steps of an exemplary method 300 for updating and/or checking emergency contact information tables using a telephone and the intelligent peripheral (IP) 10.

Method 300, which may be performed by the IP 10, starts in step 302, e.g., with a subscriber calling an "800" number designated for updating and/or checking emergency contact information. As part of the update process a subscriber calls the "800" number, and in step 304, an intelligent peripheral (IP) used in providing the emergency contact service of the invention receives the call. In step 306 the IP prompts the subscriber for login information. This information may include, e.g., a primary family telephone number and a PIN. As in the FIG. 2 update method, the family telephone number is used to identify the family contact information table while the PIN is used to determine the caller's authority to access and/or modify the information.

As an alternative to a PIN, or in conjunction with a PIN, automatic number information identification (ANI) associated with the call to the IP 10, may be used to determine the caller's right to access and/or modify a particular-information table. Operation proceeds from step 306 to step 311 via connecting node 308.

In step 311, the IP 10 receives the input from the caller. The input 310 includes the family telephone number and, optionally, a PIN. In step 312, the received information is entered to determine if it matches the stored information, i.e., if the information is correct. If the family telephone number and/or PIN is not correct the method 300, proceeds to stop step 330 with the subscriber being denied access to the emergency contact information. In some embodiments, as an alternative to being immediately denied access, the caller may be returned to step 306 and prompted to enter the information, e.g., the family telephone number and/or PIN, again.

Returning to decision step 312, if the family telephone number and/or PIN received from the subscriber is determined to be correct, operation proceeds to step 314. In step 314, the subscriber is presented with the emergency contact information table 72' corresponding to the received family telephone number. Since the subscriber is connected to the IP 10 via a telephone, the information included in the emergency contact information table 72' is presented in an audio form, e.g., using text to speech functionality supported by the IP 10. The subscriber is presented, in step 314, with the opportunity to listen to voice messages left by other family members. Stored voice messages will be played back in the family member's own voice while text messages are converted from text to speech by the IP 10 using known techniques. After being presented with all or a portion of the emergency contact information the subscriber is presented with the opportunity to update the subscriber's message and various other information fields to the extent authorized by the entered PIN or received ANI information. For example, the caller can update calling phone numbers 506, contact phone numbers 508, E-mail address 512, and E-mail notification status information. These changes can be implemented via DTMF and/or voice control. In order to support voice update commands IP 10 includes a speech recognizer. To support recording of messages IP 10 also includes a speech recording device.

In step 316, updated table information 318 is received from the subscriber. In step 320, the information 318 received from the subscriber is used to update the content of the emergency call forwarding table 72' stored in the IP 10. The IP 10 also transmits a copy of the updated table to the SCP 64 thereby updating the table 72 stored at the SCP 64. Operation proceeds from update step 320 to decision step 322. In step 322 a determination is made as to whether or not a new emergency contact number and/or contact message was entered by the caller. If no new emergency contact numbers and/or contact messages were added, operation proceeds from step 322 to step 330 where it stops.

In decision step 322, if it is determined that a new emergency contact number and/or contact message was entered, operation proceeds from step 322 to decision step 324. In step 324, the E-mail notification setting for family members other than the one making the changes is checked. If a family member other than the one making the changes has set the E-mail notification to "yes", operation proceeds to step 326, otherwise it proceeds directly to stop step 330.

In step 326 the new voice message(s), if any, are converted into a text form and an E-mail message is generated, e.g., using VXML. In various embodiments the E-mail message also includes the updated contact number(s) entered by the caller. In step 328, the e-mail, including the updated contact information, is transmitted to those family members, other than the caller, who indicated that they wanted E-mail notifications. The method 300 then stops in step 330 pending the receipt of another call by the IP 10.

Figure 4B:
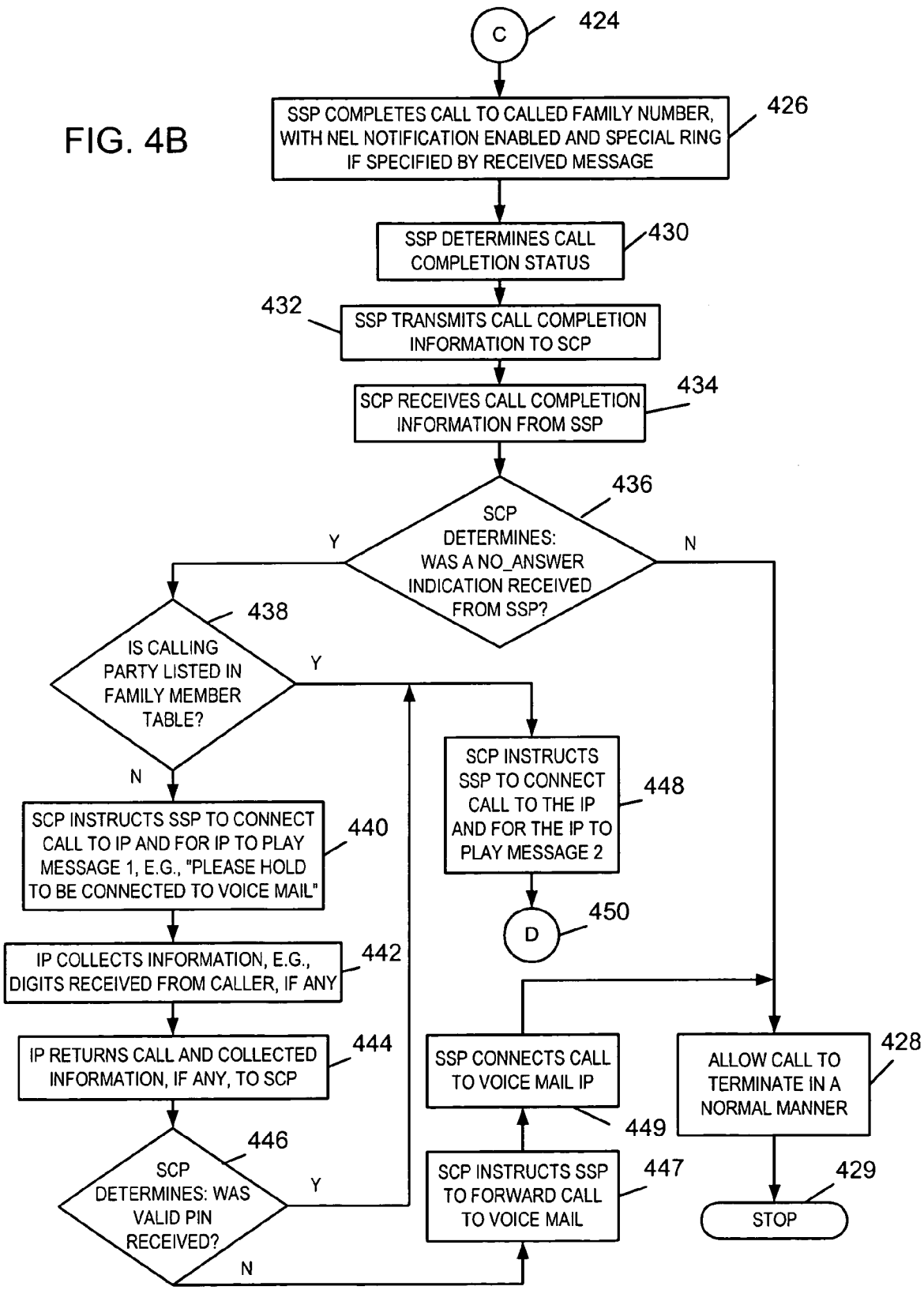
FIG. 4 is a flow diagram illustrating an exemplary communication method implemented in accordance with the present invention.
Figure 4C:
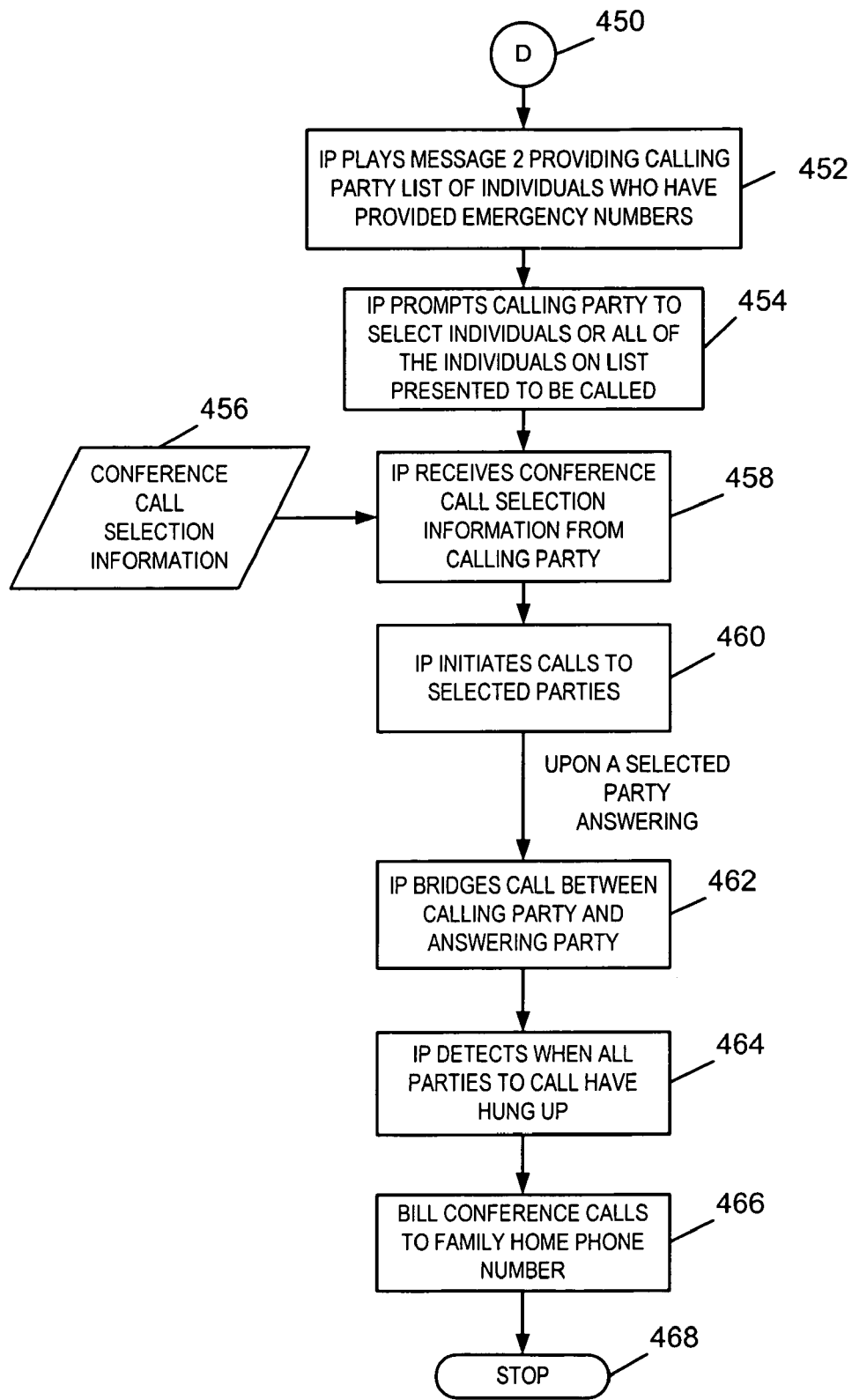

FIG. 4, which comprises the combination of FIGS. 4A–4C, illustrates the steps of an exemplary emergency contact service method 400 of the present invention. The method may be implemented by the system 100 shown in FIG. 1. FIG. 4 starts in FIG. 4A. The method 400 starts in step 402 with a AIN trigger, e.g., a terminating attempt trigger (TAT) being set on the family telephone line, e.g., on the line corresponding to telephone number (732)555-1234 in the case of the FIG. 5 example. The TAT 3, is set at the telephone switch to which the family residence is coupled, e.g., telephone switch 2 assuming the family residence is CP3 26.

Operation proceeds from start step 402 to step 404 wherein the AIN trigger, e.g., TAT 3, is activated at the SSP 2 by a call to the family number. Next, in step 406, in response to activation of the TAT 3, the SSP 2 pauses the call, and then in step 408 the SSP 2 sends a message, e.g., a TCAP message, to the SCP 64. In step 410, the SCP 64 accesses a Call Processing Record (CPR) 73 using the called party number, i.e., the family telephone number, to identify the CPR 73 to be accessed.

Under control of information in the accessed CPR 73, in step 412 the SCP 64 determines if the calling party number, included in the received TCAP message, is listed in the emergency contact information table 72 as a number corresponding to a family member. If the calling party number is listed, e.g., in Col. 506 of the FIG. 5 example, method 400 proceeds to step 416 otherwise operation proceeds to step 418. In both steps 416 and 418 the SCP 64 generates a message which is used to control call processing by the SSP 2.

In step 416, which is encountered when a calling party calls from a phone corresponding to a family member, a message is generated for the SSP 2 that causes the call to be completed to the family telephone number with a special ring and with a NEL T_busy, T_no_answer and T_answer event notification set. The special ring, e.g., any one of a plurality of distinctive rings by the SSP 2, is used to indicate to the called party that the call is from a listed family member. The NEL information is used to cause the SSP 2 to provide information back to SCP 64 regarding call completion. Operation proceeds from step 416 to step 420.

In step 418, which is encountered when a calling party telephone number is not listed in the information table 72', the SCP 64 generates a message to the SSP 2 with NEL setting information. The message causes the SSP 2 to complete the call to the called family number with a conventional ring. The setting of the NEL causes the SSP 2 to provide call completion information to the SCP 64. Operation proceeds from step 418 to step 420.

In step 420 the SCP 64 transmits the message generated in either step 416 or 418 to the SSP 2. Next, in step 422, the SSP 2 receives the message from the SCP 64 with instructions on how to proceed with the call. Operation proceeds from step 422 to step 426 via connecting node 424.

In step 426, the SSP 2 completes the call to the called family telephone number while setting the NEL functionality used to report call completion information to the SCP 64. If the calling number was listed in the emergency contact information table the SSP 2 causes the special ring used to indicate a call from a family member to be produced.

In step 430 the SSP 2 determines the call completion status, e.g., the SSP 2 determines if the line was busy, if no one answered the phone or if the phone was answered. In step 432 the SSP 2 transmits the call completion information to the SCP 64. The SCP 64 receives the transmitted call completion information in step 434 and then operation proceeds to step 436.

In step 436, the SCP 64 determines from the received information whether the call rang, but went unanswered. If someone answered the phone or the line is busy, the method 400 proceeds from step 436 to step 428, where the call is allowed to terminate in a normal manner, e.g., with the called or calling party hanging up. In some embodiments when the called party has call waiting, when the called line is busy the ISCP returns the Call to the SSP with a priority ring status assuming the calling party is determined to be a family member. In such embodiments if the called party has call waiting they will receive a priority call waiting tone versus the normal call waiting tone. Once the call is allowed to terminate, the processing of the detected call stops in step 429. While the processing of the detected call stops in step 429, the AIN trigger set at the SSP 2 remains active and may initiate processing of other calls to the family number at any time.

In step 436, if the SCP 64 determines that a no answer indication was received from the SSP 2, operation proceeds to decision step 438. In decision step 438, the SCP 64 determines from the calling party number if the calling party is listed in the emergency contact information table associated with the family, e.g., by comparing the calling party number to the telephone numbers listed in the second col. 506 of the table 72. If the calling party number is listed, the method 400 proceeds directly to step 448. However, if the calling party number is not listed in the emergency contact information table 72, the method 400 proceeds from step 438 to step 440.

In step 440, the SCP 64 sends a message to the SSP 2, instructing the SSP to connect the call to the IP 10 and to have the IP 10 play a first message, identified as message 1, e.g., "please hold to be connected to voice mail". At this point of the method 400, if the caller is a family member, calling from a telephone which is not in the table 72, has the option of entering a PIN, thereby indicating the caller's status as a family member. In step 442, the IP 10 collects any entered information from the caller, e.g., digits of a PIN. In step 444, the IP 10 returns the call and any collected information to the SCP 64. Operation then proceeds to decision step 446, wherein the SCP 64 determines if a valid PIN was received. If received input does not match a valid PIN or no PIN was received, processing proceeds to step 447 wherein the SCP 64 instructs the SSP 2 to connect the call to the voice mail IP 31 so that the caller can leave a message if desired. Then in step 449 the SSP 2 connects the call to the voice mail IP 30. After the call is connected to the IP 30, it is allowed to terminate in the usual manner in step 428.

If in step 446 the SCP 64 determines that a valid PIN was received from the caller, the method 400 proceeds to step 448. In step 448, the SCP 64 transmits a message to the SSP 2 instructing the SSP 2 to reconnect the call to the IP 10 and for the IP 10 to play a second message, identified as message 2, to the caller. Operation proceeds from step 448 to step 452 via connecting node 450.

In step 452, the IP 10 plays Message 2 to the caller. Message 2 is a message that provides a list of the individuals who have provided emergency contact numbers. At this point, stored messages corresponding to the individuals who left contact numbers may also be played to the caller. In some embodiments, individuals leaving messages can designate those messages as being for specifically identified family members. In such an embodiment, messages left for specific family members are played if the entered PIN or calling party number corresponds to the person for whom the specific message was left. In step 454, the IP 10 prompts the calling party to select individuals or all of the members on the list of people who left contact numbers whom the caller would like to include in a conference call.

In step 458, the IP 10 receives the conference call selection information 456 from the caller. Then, in step 460 the IP 10 places calls to each of the selected parties, e.g., by supplying the contact numbers submitted by the selected family members to the SSP 2 as dialed digits. Upon a selected party answering a call placed by the IP 10, method 400 proceeds to step 462 wherein the IP 10 bridges the call between the calling party and the answering party. As each called family member answers, the IP 10 adds the additional answering party to the conference call initiated by the first bridging operation. In this manner, the IP 10 can bridge in each called family member to establish a conference call between two, three or even more family members located at distinct locations. In step 464, the IP 10 detects when all the parties included in the conference call have hung up, terminating the conference call. Operation then proceeds to step 466, wherein the conference call is billed to the primary family phone number, e.g., as a function of the number of conference call participants and the duration of the conference call.

In one particular exemplary embodiment, billing of the conference call is achieved as follows. At the end of the call, the IP 10 calls the original called number, which his a TAT that causes call processing to be paused and a message to be sent to the SCP 65. In such an embodiment, he SCP 64 recognizes the calling number as being from the IP 10. When ISCP opens the CPR it looks in the billing field to determine the number of parties in the conference call and the duration of the call. This information is placed into these fields at the time the IP 10 initiates the billing call to the called number, e.g., family telephone number. The SCP 64 then sends an AMAslpID to the SSP with the billing information causing the conference call to be billed to the original called party. The SCP 64 then disconnects the connection with the IP 10, e.g., terminates the billing call. With the conference call completed and billed, processing of the unanswered call, which resulted in the conference, stops in step 468.

The present invention is not limited to times of national and family emergencies. It may be used for general purposes. For example, if a family member has to unexpectedly leave the house, they can use the present invention and leave a message explaining their whereabouts and providing contact forwarding numbers. In addition, children who leave the home to visit friends can use the service as a way of providing their parents with a message and a contact number, which the parents can access from a phone or even the Internet from a remote location.

While described in the context of an AIN system, the methods of the present invention can be implemented using a wide range of telephony devices, and, as IP telephony grows, may even be implemented in an IP based communications system. In addition, as an alternative to an AIN based implementation the communications service may be implemented using a PBX system which may include, or be coupled to, telephone conferencing circuitry.

While the communications service has been generally described as an emergency contact service for family members, in one embodiment the service is used to provide a caller placing a call to an unanswered telephone number with a list of individuals who may be selected for conferencing. The calling party is then provided with the opportunity to select one or more individuals from the list and to have a conference call automatically initiated with the selected individual or individuals. Such a service is useful in, among other things, business applications where a manager may want callers to be presented with a list of alternative individuals who may handle an incoming call in the manager's absence.

Numerous variations on the above described methods and apparatus are possible without departing from the scope of the invention.

What is claimed is:

1. A communications method, comprising:
   detecting when a call to a telephone number goes unanswered;
   determining if the unanswered call is from a member of a group identified in a stored set of information associated with the called telephone number; and
   when it is determined that the calling party is a member of the group identified in said stored set of information:
      presenting the calling party with a list of other members of said group who have provided telephone numbers for contact purposes;
      receiving information from the calling party identifying one or more members of the group who are to be included in a conference call; and
      initiating a conference call to any group members identified by the received information.

2. The method of claim 1, wherein the step of initiating a conference call includes placing calls to at least two group members using telephone numbers corresponding to said two group members obtained from said stored set of information.

3. The method of claim 2, further comprising:
   connecting said unanswered call to a telephone switch peripheral device when it is determined that the unanswered call is from a member of the group identified in the stored set of information; and
   wherein the step of presenting the calling party with a list of other members of said group includes operating said peripheral device to play a message to said calling party including the names of other members of said group who have provided telephone numbers.

4. The method of claim 3, further comprising the step of playing messages from multiple members of said group to the calling party prior to initiating said conference call.

5. The method of claim 4,
   wherein said step of initiating a conference call includes operating said peripheral device to initiate calls to any group member identified by the received information.

6. The method of claim 5, further comprising:
   detecting when a call initiated to a group member identified by the received information is answered; and
   bridging the answered call with the call from the calling party.

7. The method of claim 2, wherein the step of determining if the unanswered call is from a member of a group identified in said stored set of information associated with the called telephone number includes:
   comparing a calling party telephone number obtained using automatic number identification information to a list of telephone numbers corresponding to the members of said group.

8. The method of claim 2,
   wherein the step of detecting when a call to a telephone number goes unanswered includes operating a telephone switch to provide call termination information to a service control point; and wherein the step of determining if the unanswered call is from a member of a group identified in said stored set of information associated with the called telephone number includes:

operating the service control point to compare a number obtained from the calling party to a list of identification numbers corresponding to the members of said group.

9. The method of claim 1, further comprising the step of:

maintaining said set of stored information in a location accessible to a telephone switch peripheral device;

operating said telephone switch peripheral device to receive information updating said stored information;

generating an E-mail message including at least some of the received information used to update said stored information; and transmitting the generated E-mail message to at least one member of said group.

10. The method of claim 9, wherein said step of operating said telephone switch peripheral device to receive information includes operating said telephone switch peripheral device to receive a call from a member of said group.

11. The method of claim 10, wherein said received information includes a spoken message; and wherein the step of generating an E-mail message includes:

i) performing a speech recognition operation on the spoken message; and ii) incorporating at least some text generated by said speech recognition operation into said E-mail message.

12. The method of claim 9, wherein said step of operating said telephone switch peripheral device to receive information includes operating said telephone switch to receive an emergency contact telephone number corresponding to a member of said group via the Internet.

13. The method of claim 12, wherein the step of generating an E-mail message includes:

incorporating the received emergency contact telephone number into said E-mail message.

14. A communications system, comprising:

a telephone switch for receiving calls directed to a subscriber telephone number;

a peripheral device coupled to said switch including:

i. circuitry for accessing a set of information corresponding to the subscriber telephone number, the set of information including a list of telephone numbers corresponding to a group of individuals associated with said subscriber telephone number;

ii. circuitry for playing a message to a calling party who made an unanswered call to the subscriber telephone number, the message including the names of the group members who have included contact telephone numbers in said set of information;

iii. call conferencing circuitry coupled to said telephone switch for placing calls to members of said group selected by the calling party and for bridging said calls to the call placed by the calling party to the subscriber telephone number when said calls are answered; and a service control point coupled to said telephone switch including control logic for instructing said switch to connect an unanswered call directed to said subscriber telephone number to said peripheral device in response to receiving call completion status information indicating that the call has gone unanswered.

15. The system of claim 14, further comprising:

means for allowing a member of said group to update an emergency contact telephone number via the Internet; and means for generating an E-mail message notifying at least one member of the group when an emergency contact telephone number is updated.

16. The system of claim 14, wherein the peripheral device further comprises:

means for receiving a call from a member of said group seeking to update an emergency contact telephone number stored in said set of information; and means for generating an E-mail message notifying at least one member of the group when an emergency contact telephone number is updated by a received telephone call.

17. The system of claim 14, wherein said set of information is stored in said peripheral device; and wherein a duplicate copy of at least some information in said set of information is stored in the service control point.

18. A communications method comprising:

storing a set of information including a list of members of a group associated with a telephone number who may be contacted when a call to said telephone number goes unanswered, the set of information including for each group member who may be contacted, a contact telephone number;

detecting, based on the failure to receive an answer to the call, when a call to the telephone number associated with said group goes unanswered;

presenting the calling party placing the unanswered call with a list of group members who have contact telephone numbers stored in said set of information;

receiving information from the calling party indicating the group member or members who the calling party would like to contact; and initiating a conference call using at least one contact telephone number obtained from the set of stored information corresponding to a group member indicated by the received information.

19. The method of claim 18, further comprising the step of:

providing the calling party with stored messages corresponding to at least some of group members who have contact telephone numbers stored in said set of information.

20. The method of claim 18, wherein the step of initiating a conference call includes the steps of:

placing separate calls to at least two members of said group using contact telephone numbers obtained from the set of stored information;

detecting when a placed call is answered; and bridging each answered placed call with the call from the calling party to establish a conference call.

* * * * *